United States Patent [19]
Bayer et al.

[11] Patent Number: 5,282,924
[45] Date of Patent: Feb. 1, 1994

[54] MICROMECHANICAL SENSOR FABRICATION PROCESS

[75] Inventors: Thomas Bayer, Sindelfingen; Johann Greschner, Pliezhausen, both of Fed. Rep. of Germany

[73] Assignee: International Business Machines Corporation, Armonk, N.Y.

[21] Appl. No.: 34,639

[22] Filed: Mar. 22, 1993

Related U.S. Application Data

[63] Continuation of Ser. No. 735,487, Jul. 25, 1991, abandoned.

[30] Foreign Application Priority Data

Jul. 25, 1990 [EP] European Pat. Off. ........ 90114219.0

[51] Int. Cl.$^5$ .................... H01L 21/306; B44C 1/22; C03C 15/00; C03C 25/06
[52] U.S. Cl. .................................. 156/643; 156/651; 156/657; 156/659.1; 156/662
[58] Field of Search .............. 29/625.35, 621.1; 156/643, 646, 647, 651, 653, 657, 659.1, 661.1, 662; 310/310, 328, 332; 250/306, 307

[56] References Cited

U.S. PATENT DOCUMENTS

| | | | |
|---|---|---|---|
| 4,715,930 | 12/1987 | Diem | 156/651 X |
| 4,943,719 | 7/1990 | Akamine et al. | 156/647 X |
| 4,968,585 | 11/1990 | Albrecht et al. | 156/662 X |
| 5,017,266 | 5/1991 | Zdeblick et al. | 156/651 X |
| 5,021,364 | 6/1991 | Akamine et al. | 156/647 X |
| 5,026,437 | 6/1991 | Neukermans et al. | 156/657 X |
| 5,066,358 | 11/1991 | Quate et al. | 156/647 X |

Primary Examiner—William Powell
Attorney, Agent, or Firm—J. D. Ellett, Jr.; Robert M. Trepp

[57] ABSTRACT

A method for producing micromechanical sensors for the AFM/STM/MFM profilometry is described in which a multiple step mask of cantilever beam and tip is transferred step by step into the wafer substrate by reactive ion etching. A particular highly anisotropic etching step is used for etching and shaping of the tip. This process step uses an Ar/C12 ambient at a pressure of about 100 $^6$bar and a self bias voltage of about 300 V DC. The ratio of pressure to self bias voltage determines the concave shape of the tip side-walls. This etching step is followed by a thermal oxidation step. The oxidation is carried out for a time until the oxidation fronts at the thinnest point of the tip shaft touch each other. A stripping process with buffered hydrofluoric acid gently removes the thermally grown oxide. The oxidation process allows—via oxidation time—a modification of tip height and angle in an extremely controllable manner. To prevent sticking of the tip to the structure to be profiled the ratio of tip diameter to tip height should be about 1:10. Should this ratio be exceeded the tip has to be arranged on a pedestal. The structure, comprising a cantilever beam and a tip on pedestal, can be produced with the same but slightly modified process of the invention.

30 Claims, 5 Drawing Sheets

MICROMECHANICAL SENSOR FABRICATION PROCESS

This application is a continuation of application Ser. No. 07/735,487, filed Jul. 25, 1991, now abandoned.

FIELD OF THE INVENTION

The present invention relates broadly to microscopic profilometry and more particulrly to a micromechanical sensor for an atomic force microscope ("AFM"), a scanning tunneling microscope ("STM"), or a magnetic force microscope ("MEM") and methods for fabricating such sensors. Micromechanical sensors for AFM/STM/MFM profilometry generally comprise a cantilever beam which bears a shaped tip at a free end.

BACKGROUND ART

The scanning tunneling microscope has stimulated the development of new techniques for microcharacterization of materials which are based on the use of a very fine tip. One of these techniques involves the atomic force microscope which has recently demonstrated the capability to profile and image conductors and insulators.

In an initial design of the AFM (Binnig G, Quate CF, Gerber Ch, (1986) "Atomic Force Microscope," *Phys. Rev. Lett.* vol. 56, pp. 930-933 and European patent application Serial No. EP-A-0 223 918) a sensor consisting of a spring-like cantilever which is rigidly mounted at one end and carries at its free end a dielectric tip profiles the surface of an object. The force between the object's surface and the tip deflects the cantilever, and this deflection can be accurately measured, for example, by a second tip which is part of an STM. A lateral spatial resolution of approximately 3 nm has initially been achieved.

Another version of the AFM includes optical detection instead of an STM detection. In this version, a tungsten tip at the end of a wire is mounted on a piezoelectric transducer. The transducer vibrates the tip at a resonance frequency of the wire, which acts as a cantilever, and a laser heterodyne interferometer accurately measures the amplitude of the a. c. vibration. The gradient of the force between the tip and sample modifies the compliance of the lever, hence incucing a change in vibration amplitude due to a shift of the cantilever resonance. Knowing the cantilever characteristics, one can measure the vibration amplitude as a function of the tip-to-sample spacing in order to deduce the gradient of the force, and thus, the force itself. See, Duerig UT, Gimzewski JK, Pohl DW (1986) "Experimental Observation of Forces Acting During Scanning Tunneling Microscopy," *Phys. Rev. Lett.* vol. 57, pp. 2403-2406; and Martin Y, Williams CC, Wickramasinghe HK (1987) "Atomic Force Microscope-Force Mapping and Profiling on a sub 100-A Scale," *J. Appl. Phys.* vol. 61(10), pp. 4723-4729.

A critical component in the AFM is the spring-like cantilever. For maximum sensitivity, a maximum deflection for a given force is needed, which calls for a cantilever that is as soft as possible. At the same time, in order to minimize the sensitivity to vibrational noise from the surroundings, a stiff cantilever with a high eigenfrequency is necessary. Ambient vibrations—which typically stem from building vibrations—ordinarily have a frequency spectrum essentially limited to less than roughly 100 Hertz.

If the cantilever is chosen such that it has an eigenfrequency $f_o \geq 10$ kHz, the ambient vibrations will be attenuated to a negligible value. These requirements can be met by reducing the geometrical dimensions of the cantilever as reflected by the two equations set forth below.

The eigenfrequency $f_o$ of the cantilever is given by $$f_o = 0.162 \frac{t}{l^2} \sqrt{\frac{E}{\rho} K} \quad (1)$$

wherein E is Young's modulus of elasticity, $\rho$ is the density, and K is a correction factor close to unity, l is the length, and t is the thickness of the cantilever.

The spring constant of the cantilever on which its sensitivity depends is given by $$C = \frac{F}{Y} = \frac{Ewt^3}{4l^3} \quad (2)$$

wherein F is the force which causes the deflection y of the cantilever, E is Young's modulus of elasticity, w is the width, l is the length, and t is the thickness of the cantilever. In accordance with the spring constant term, the sensitivity of the cantilever is dependent on its dimensions and on the material of which it consists, with the highest sensitivity being obtained for long, thin and narrow cantilever beams. The width of the cantilever beam should be sufficiently large so that lateral vibrations are suppressed. Also, the width of the beam should permit the fabrication of additional structures, such as tips, thereon. Therefore, a minimum width w of around 10 μm is generally required as a practical matter. In practice, the spring constant C has to be greater than about 1 N/m in order to avoid instabilities during sensing of attractive forces, to prevent excessive thermal vibrations of the cantilever beam, and to obtain a measurable response.

Approximates dimensions of a cantilever beam composed of single-crystal silicon compatible with C=1 N/m, and $f_o = 10$ kHz may be, for example: l=800 μm, w=75 μm, and t=5.5 μm.

In the normal deflection mode of the cantilever beam, forces in the order of $10^{-12}$N can be detected. The sensitivity of the sensor head can be further enhanced by vibrating the object to be profiled at the resonance frequency $f_o$ of the cantilever beam, as described by G. Binning et al. in *Phys. Rev. Lett.* vol. 56 (1986), pp. 930-933.

In the AFM realized in accordance with the aforementioned Binning et al. article and with European patent application EP-A-0 223 918, the requirements for cantilever and tip were met by a gold foil of about 25 μm thickness, 800 μm length, and 250 μm width to which a diamond fragment was attached with a small amount of glue. Another proposal used microfabrication techniques to construct thin-film (1.5 μm thick) SiO$_2$ microcantilevers with very low mass on which miniature cones could be grown by evaporation of material through a very small hole (Albrecht ThR, Quate CF, (1988) "Atomic Resolution with the Atomic Force Microscope on Conductors and Nonconductors," *J. Vac. Sci. Technol.*, pp. 271-274.

From the foregoing description of the state of the art it was known to construct, in a first process step, cantilevers, and, in a second process step, to attach tips thereto. However, the construction of a cantilever with tip of that type is extremely delicate and prone to low yield.

Most recently, several processes have been developed for producing micromechanical sensor heads for AFM/STM profilometry. See, for example, European patent applications EP-A-89 115 100.3, EP-A-89 115 099.7, and EP-A-89 115 097.1.

European patent application EP-A-89 115 100.3 describes a process for producing a cantilever beam with an integrated tip. In this process a mask is produced which contains all relevant information for the desired cantilever beam pattern and tip pattern. In a subsequent etching process the pattern of the mask is transferred step by step to a silicon substrate. The shape of the tip is determined by anisotropic wet and underetching of the tip mask. The tip terminates as a straight line in the form of a multisided pyramid. The cone angle of the tip made in accordance with this process is $\geq 35°$.

However, for the present invention it is desirable to have a method by which conically shaped tips can be produced with cone angles $<30°$, preferably about $10°$, with highest accuracy and high yield. Particularly in magnetic force microscopy, the domain resolution depends on the tip shape and cone angle.

It is an object of the invention to provide a method for the construction of microcantilevers with integrated tips, which method uses a suitable combination of deposition, lithography, etching, and oxidation steps. The invention also comprises structures made in accordance with the method of the invention.

Prior to starting with the description of the details of the invention, reference is made to the following publications relating to micromechanics:

Petersen, KE, "Dynamic Micromechanics on Silicon: Techniques and Devices," *IEEE Tran. Electron Devices*, Vol. ED-25, No. 10, October 1978, pp. 1241–1250;

Petersen, KE, "Silicon as a Mechanical Material," *Proc. of the IEEE*, Vol. 70, No. 5, May 1982, pp. 420–457; and Jolly, RD, Muller, RS, "Miniature Cantilever Beams Fabricated by Anisotropic Etching of Silicon," *J. Electrochem Soc.: Solid-State Science and Technology*, December 1980, pp. 2750–2754.

SUMMARY OF THE INVENTION

With the method of the present invention, low-mass microcantilever beams can be made with an integrated tip for interaction with the surface of a sample to be profiled. The force and resonance frequency requirements of the cantilever beam and integrated tip are met by using microfabrication techniques. Due to the fact that cantilever and tip are made from one piece of material there are no adhesion problems between cantilever and tip.

The process of the present invention involves producing a mask which contains effectively all relevant information for the substrate etching of the cantilever beam and the tip in a manner which generally parallels the mask production process of European patent application EP-A-89 115 100.3 noted above, (see FIGS. 4a to 4c of the European application. In the present invention, an anisotropic ion etching process is used for etching the cantilever beam and the basic shape of the tip into the substrate. The process of the invention includes a thermal oxidation step to define the shape of the tip. The thermal oxidation step is followed by a stripping process which gently removes the thermally grown silicon dioxide.

The oxidation step in particular allows an extremely exact definition and variation of tip height and cone angle via oxidation time. The thermal oxidation is preferably carried out at a temperature of at least about 1000° C. in the presence of water vapor. A temperature range of from about 1000 to about 1100° C. is preferred for the thermal oxidation, with a temperature of about 1050° C. being particularily preferred. The pressure of the water vapor is preferably about one atmosphere.

Micromechanical sensors with tips having cone angles of from about 50° down to 10° or so can readily be achieved in high yields with the present invention.

A first preferred embodiment of the process of the invention relates to the development of a structure, such as a tip, on an already 3-dimensionally structured substrate, such as a cantilever beam. Conventionally, in such processes problems can arise, for example, when the cantilever beams, which are flexible and fragile, have to be coated with photo-resist for subsequent exposure. These and other problems are solved in the first embodiment in that a multiple-step mask which is applied to a substrate is structured in such a manner that it contains effectively all relevant information for the subsequent substrate etching process. The structures of all lithography steps are etched one after the other into the multiple-step mask before the substrate is etched. Subsequently, the information is transferred step by step from the mask into the substrate. Between two successive substrate etching process steps, there is a mask etching step which does not require an additional lithography step. The multiple step mask can be fabricated in conventional planar technology. A further advantage of the preferred embodiment is that problems with respect to photoresist coverage and exposure are obviated as the multiple-step mask has a thickness of only a few $\mu$m. The process benefits from a high selectivity of mask versus substrate in the substrate etching process, which comprises several dry etching steps.

By the process of a second embodiment of the present invention, a tip on a pedestal is produced. As mentioned in the introduction to the description, the sensitivity of cantilever beam and tip depends on their dimensions. Where a very small diameter of the tip is desired for investigating submicron structures, the tip length is limited to a certain value to prevent the tip from sticking to the structures to be investigated. In practice, the ratio of tip diameter to tip length should be about 1:10 or less to avoid such sticking. Therefore, in order to obtain a distance from the tip end to the cantilever beam of about 6 to 10 $\mu$m the tip has to be arranged on a pedestal.

The process of the second embodiment is a completely self-aligned process for producing a tip with a diameter of about 0.2 $\mu$m and a length of about 2 $\mu$m arranged on a pedestal with a diameter of about 1 $\mu$m in an absolutely concentrical manner. This process is extremely advantageous over the prior art process (EP-A-89 115 100.3, third example, claim 19) where a tip with a base diameter of 30 $\mu$m arranged on a pedestal with a diameter of about 100 to 200 $\mu$m is produced, with the associated etching masks being adjusted against each other.

BRIEF DESCRIPTION OF THE DRAWINGS

Details of several embodiments of the present invention will be described by way of example with respect to the accompanying drawings in which.

DETAILED DESCRIPTION OF PREFERRED EMBODIMENTS

A first example of preferred embodiment of the process of the invention is described in accordance with FIGS. 1(a) to 1(i). In this example a cantilever beam approximately 100 μm long, approximately 15 μm wide and approximately 3 μm thick is produced having an integrated tip projecting approximately 5 μm above the beam surface.

Figure 1A:
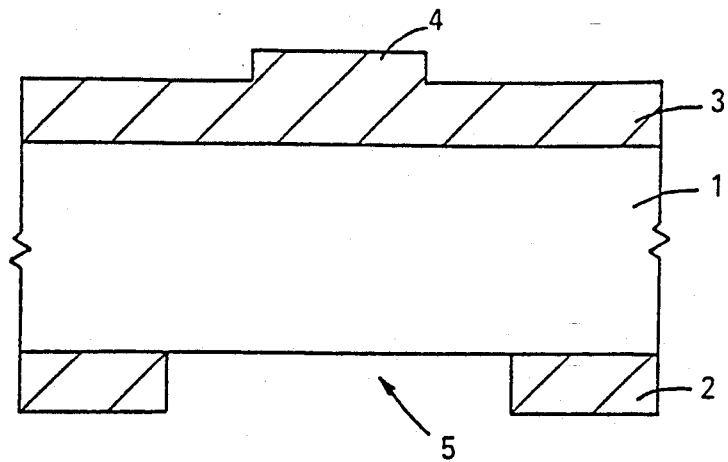
FIGS. 1A through 1I shows a sequence of process steps for making a cantilever beam with an integrated tip which has been worked out of a silicon wafer substrate, using a mask with two levels of information, and photolithographic, etching and oxidation steps.

Turning now to FIG. 1a, a (100) silicon wafer (1) about 250 μm thick is bilaterally coated with silicon dioxide. The oxide layers (3) and (2) on a top side and on a bottom side of the wafer are thermally grown to a layer thickness of about 3 μm. Alternatively, the oxide layers can be applied by sputter deposition or by (PE)CVD. In a first photolithographic step, the patterns of cantilever beam (4) and of rectangular openings (5) which are subsequently transferred into the upper part of silicon dioxide layers (3) and (2) are defined. For this purpose a positive photoresist commercially available from the Shipley Company under the trade designation "AZ1350" is applied sequentially to the two sides of the oxide coated wafer (1) (not shown). Specifically, a first layer of photoresist is first spun on one side of the wafer and the wafer baked to cure the layer, and then a second layer of photoresist is spun on the opposite side of the wafer and the wafer baked to cure the second layer. The photoresist layers on both sides are exposed at the same time and developed, with the respective masks on the bottom side of the wafer being in alignment with those on the top side. The two-sided exposure may be carried out using a mask alignment and exposure tool commercially available from the Carl Suess company of Munich, Germany under the trade designation "Type MA-25." The oxide on both sides is etched in 5:1 buffered hydrofluoric acid or by reactive ion etching under the following process conditions:
etch gas: $CF_4$
pressure range: from about 1 to about 10 μbar.

The etching of the oxide is carried out for a time to etch the oxide on the top side to a depth of about 1.5 μm to transfer the cantilever beam pattern to the oxide. Next, the top side is protected by a baked photoresist layer, and the oxide residue in the exposed area (5) on the bottom side of the wafer is removed by etching in 5:1 buffered hydrofluoric acid. Next, the remaining photoresist is removed. The resulting structure is shown in FIG. 1a.

In a second photolithographic step the pattern (6) of the tip is defined in a newly applied photoresist layer (not shown) over silicon dioxide cantilever pattern (4).

Figure 1B:
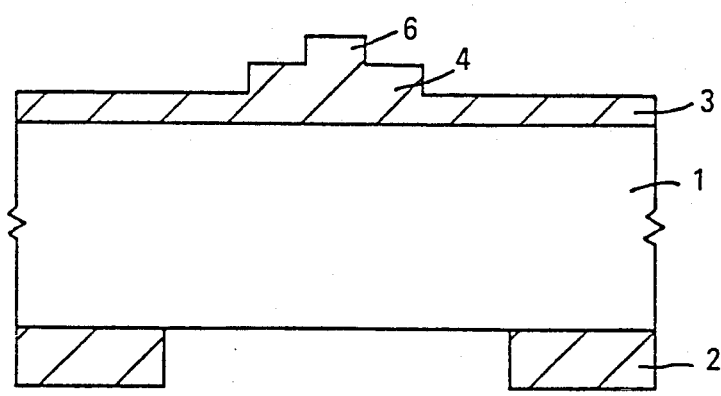

The photoresist tip pattern is transferred into the silicon dioxide by etching in 5:1 buffered hydrofluoric acid or by reactive ion etching, as described above, to a depth of about 1.3 μm. During this etching step the cantilever beam pattern (4) is transferred to a deeper level of layer (3), and the thickness of the remaining silicon dioxide layer (3) is reduced correspondingly to about 0.2 μm or so. The bottom side of the wafer is protected by a baked photoresist layer during this step. The resulting multiple-step silicon dioxide mask structure (4, 6) which will then be transferred step by step into the silicon substrate (1) is shown in FIG. 1b.

Prior to this mask structure transfer, the silicon wafer (1) is thinned down by etching from the bottom side to a thickness which corresponds to about the thickness of the cantilever beam plus about twice the height of the tip plus a residual wafer thickness which is consumed during thermal oxidation. In this example, the wafer is thinned to a thickness of approximately 14 μm. This etching step, which uses an about 37.5 wt percent aqueous KOH solution at about 80° C., is anisotropic. The resulting structure is shown in FIG. 1c.

Figure 1C:
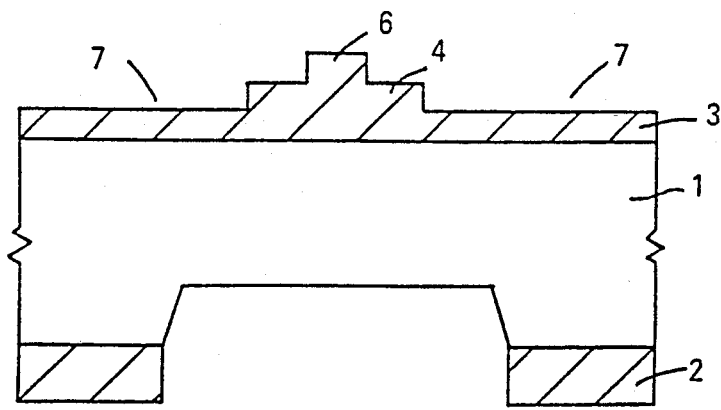
Figure 1D:
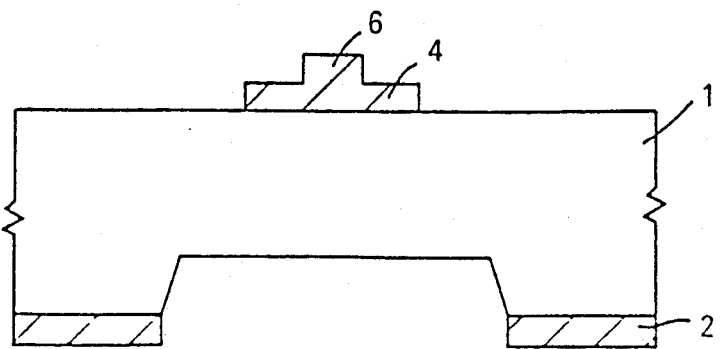

Next, as shown in FIGS. 1c and d, silicon dioxide layer (3) with structure (4) and (6) is etched in 5:1 buffered hydrofluoric acid or by reactive ion etching, as described above, to such a depth that the silicon dioxide areas (7) abutting cantilever beam mask (4) are removed.

An anisotropic reactive ion etching step follows for the transfer of the cantilever beam pattern (4) into the silicon wafer (1). The reactive ion etching performed for that purpose is carried out under the following conditions:

etch gas: approximately 10 flow percent chlorine, remainder Ar or He;
pressure range: from about 2 to about 20 μbar, preferably approximately 10 μbar.

Figure 1E:
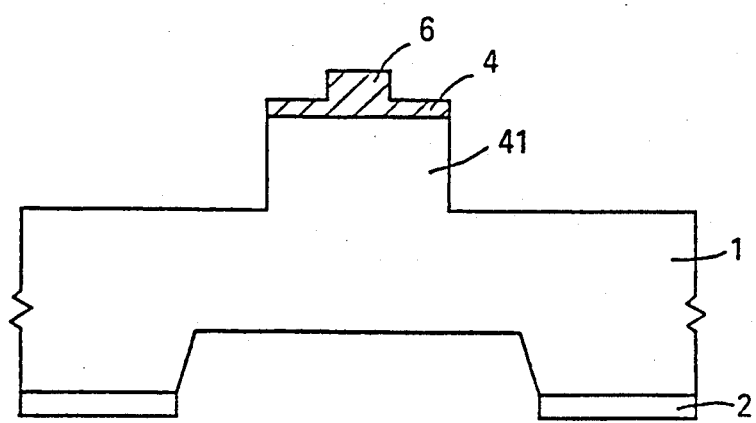

Alternative methods for etching silicon can use gas mixtures with a content of $SF_6$, $Cl_2$ and helium; or $CCl_2F_2$ and $O_2$; or $SiF_4$, $Cl_2$ and helium or argon. In a system with approximately 10 flow percent $Cl_2$ in argon, etching rate ratios of silicon to silicon dioxide of up to 20:1 are obtained. The anisotropic etching step removes the areas of the silicon wafer (1) originally underlying silicon dioxide areas (7) in a depth which corresponds to the desired silicon cantilever beam thickness (FIG. 1e).

Figure 1F:
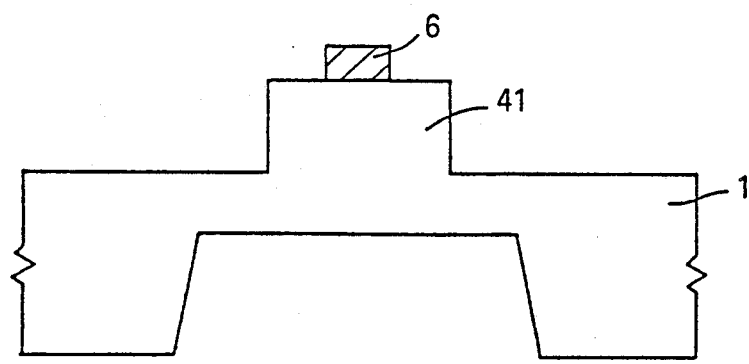

Now, silicon dioxide cantilever beam mask (4) and the silicon dioxide masks (2) on the bottom side of the wafer are removed by etching in 5:1 buffered hydrofluoric acid or by reactive ion etching, as described above. The resulting structure with cantilever beam (41) and tip mask (6) on top is shown in FIG. 1f.

Figure 1G:
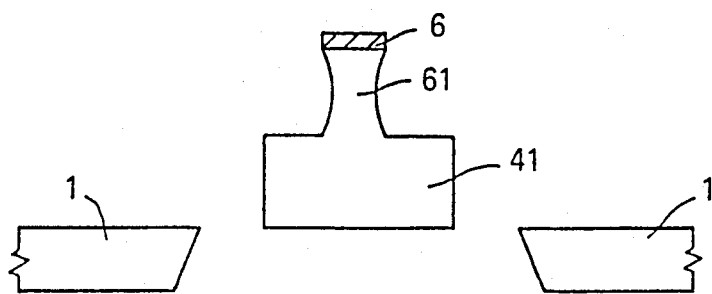

A particular highly anisotropic etching step follows for etching and shaping tip (61, FIG. 1g). First, the basic shape of the tip (61) is produced. At the same time the sidewalls of the resulting 'blank' (61) are etched such that a concave shape is obtained. The concave tip sidewalls are a result of ion scattering in the plasma sheath according to an appropriate ratio of pressure to self bias voltage. This is achieved by an $Ar/Cl_2$ or $He/Cl_2$ reactive ion etching process. The reactive ion etching process uses a relatively high pressure of about 100 μbar, and a comparatively low self bias voltage of about 300 V DC in a parallel plate reactor having a reactor chamber volume of about 50 liters, a cathode diameter of about 520 μm and an electrode spacing of about 150 μm. A radio frequency power signal applied to the electrodes has a frequency of about 13.56 MHz and a power level to provide a power density of approximately 0.15 watts/cm². The etching time is determined by the desired ratio of tip thickness to tip height. Concurrently with the etching and shaping of the tip (61), the cantilever beam is released from the wafer body (1).

The silicon dioxide etching mask (6) is removed by etching with 5:1 or concentrated buffered hydrofluoric acid.

The radius of curvature of the resulting concave sidewalls essentially determines the smallest obtainable cone angle of the future conically shaped tip.

Figure 1H:
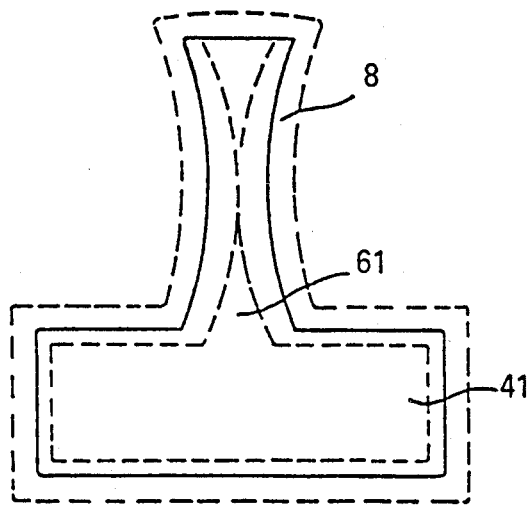
Figure 1I:
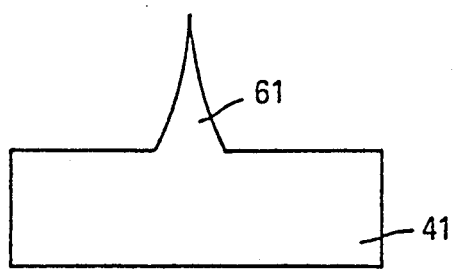

The reactive ion etching step is followed by a highly controlled process step, i.e., thermal oxidation. For the present example, this oxidation is carried out at a temperature of about 1050° C. in water vapor at approximately atmospheric pressure. FIG. 1h shows a sectional view of a phase where the oxidation fronts (8) touch each other at the thinnest point of the blank. As the volume grows during the thermal oxidation, the thickness and height of the blank (61) are increased, which tends to increase the strength of the blank against mechanical damage. The thermal oxidation process is followed by a stripping process which gently removes the thermally grown silicon dioxide (8). The stripping process uses a buffered hydrofluoric acid solution prepared by mixing about one part of an approximately 50 percent by weight aqueous HF solution with about five parts of an approximately 40 percent by weight aqueous NH₄F solution. The stripping process was carried out by immersing the blank in the buffered acid solution at room temperature without agitation. The resulting structure which comprises cantilever beam (41) and tip (61) is shown in FIG. 1i.

Scanning-electron-microscope micrographs showed that the tip height and the cone angle of the tip could be modified in an extremely controllable manner by adjusting the oxidation time. The radii of the tips made in accordance with the process of this invention were 10 nm or less. Furthermore the tips were characterized by an excellent rotational symmetry. Compared with the prior art processes for making micromechanical sensors, the process of the present invention is characterized by a high flexibility with respect to the tip shape and an extraordinary high yield.

A second example of the process of the invention is described below in accordance with FIG. 2(a to e).

The process steps for producing the multiple-step cantilever beam and tip mask, and the mask on the bottom side of the wafer, as well as the step for thinning down the silicon wafer by etching from the bottom side are identical to those described for the first example above in accordance with FIGS. 1a to 1d.

The silicon dioxide areas abutting the cantilever beam mask were removed by etching, as described above (not shown). Next, the cantilever beam pattern was transferred into the silicon wafer by reactive ion etching in an Ar/Cl₂ or He/Cl₂ ambient at a pressure of about 10 μbar. Subsequently, the silicon-dioxide cantilever beam mask, and the silicon dioxide mask on the bottom side of the wafer were removed by etching, as described in Example 1 (not shown).

Figure 2A:
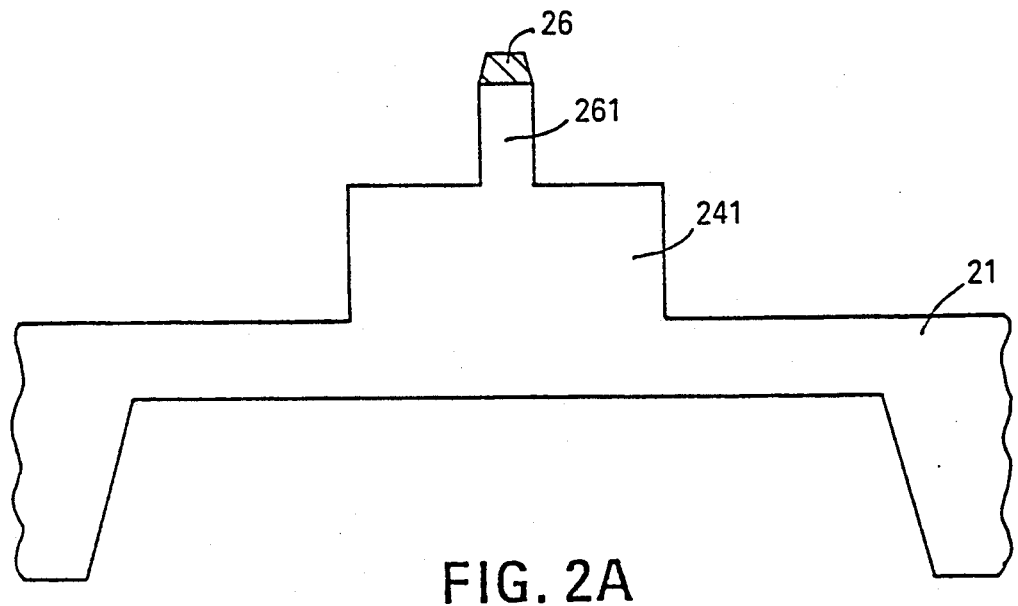
FIGS. 2A through 2E shows a sequence of process steps for making a cantilever beam with integrated tip on a pedestal which has been worked out of a silicon wafer substrate, using a mask with two levels of information, and photolithographic, etching and oxidation steps.

Now follows an anisotropic etching step for shaping the tip. As noted below, the tip sidewalls may be either straight or concave. In order to obtain a tip shaft with straight sidewalls, the etching is carried out in an Ar/Cl₂ or He/Cl₂ ambient at a pressure of about 10 μbar, and for a time depending on the desired etch depth, i.e., length of the tip shaft. In order to obtain a tip shaft with concave sidewalls the etching is carried out in an Ar/Cl₂ or He/Cl₂ ambient at a relatively high pressure and a comparatively low self bias voltage, as described in example 1. The resulting structure, comprising silicon substrate (21), cantilever beam (241), tip (261), and tip mask (26) is shown in FIG. 2a.

Figure 2B:
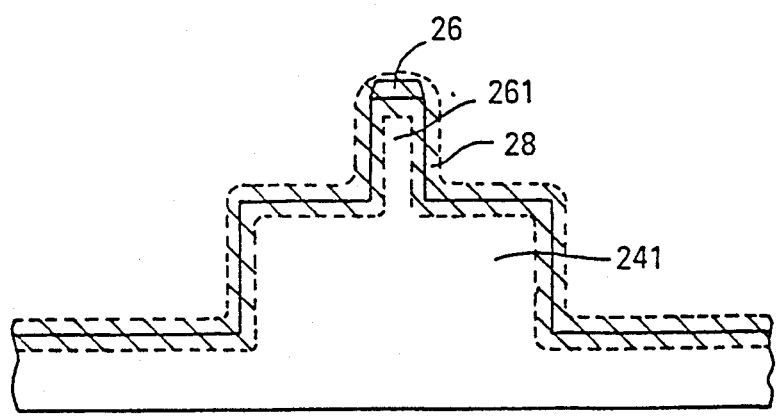

The reactive ion etching step is followed by a highly controlled process step, i.e. thermal oxidation. As described in example 1, the oxidation is carried out at a temperature of about 1050° C. in water vapors at approximately atmospheric pressure. The resulting structure, with silicon dioxide (28) covering all horizontal and vertical surfaces of structure (261, 241) and substrate (21), is shown in FIG. 2b.

Figure 2C:
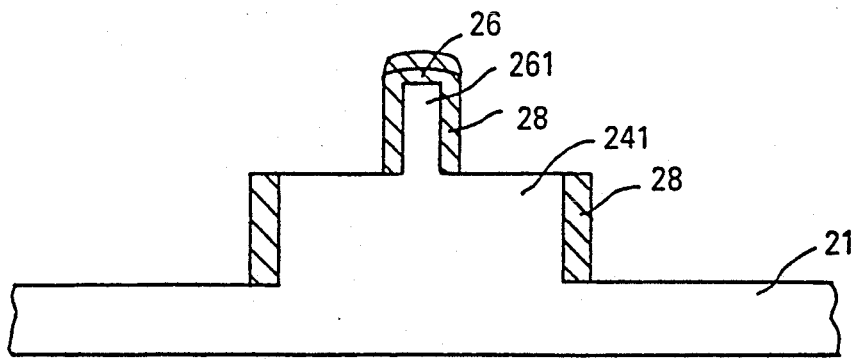

Next, the silicon dioxide (28) is removed from all horizontal surfaces of the structure by reactive ion etching in CF₄ a pressure of about 10 μbar. This etching is interrupted when all silicon dioxide has been removed from the horizontal surfaces. The resulting structure is shown in FIG. 2c.

Figure 2D:
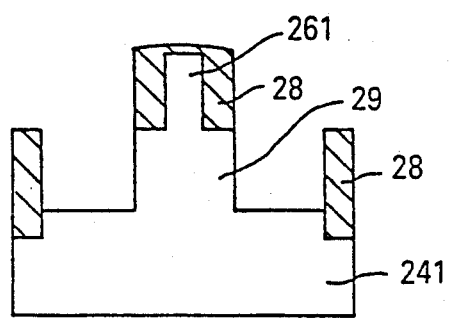
Figure 2E:
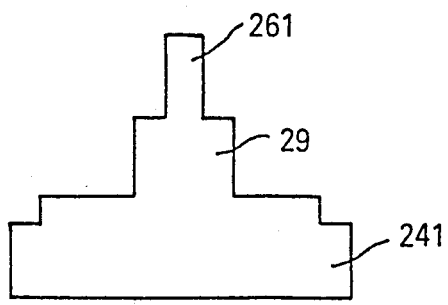

Next, a pedestal (29) is etched into the cantilever beam (241) to a desired depth, with the layers of silicon dioxide (28) on the vertical surfaces of structure (261, 241) and tip mask (26) acting as masks. The reactive ion etching is carried out in an Ar/Cl₂ or He/Cl₂ ambient at a pressure of about 10 μbar. The pedestal has a height of about 3 to 4 μm measured from the surface of the cantilever beam and a diameter of roughly 1 to 2 μm. Concurrently with the pedestal etching, the cantilever beam is released from the wafer body (21). The resulting structure is shown in FIG. 2d. The reactive ion etching process step is followed by a stripping process which uses 5:1 or concentrated buffered hydrofluoric acid, and gently removes the remaining silicon dioxide masks. The final structure, comprising cantilever beam (241), pedestal (29), and tip (261) with a rectangular cross-section, is shown in FIG. 2e.

The tip (261) may be pointed in a maskless argon ion etching step, utilizing the effect that for the combination of argon gas and silicon substrate, the etch rate is angle-dependent. The process parameters for the pointing of the tip are:—flow: approximately 20 sccm Ar,—pressure: approximately 3 μbar,—RF: approximately 1000 V, and DC: approximately 630 V. The argon ion etching may be carried out in a parallel plate reactor having a cathode diameter of about 520 μm, an electrode spacing of about 150 μm and a reactor chamber volume of about 15 liters.

Alternatively and as mentioned above, the tip shaping can be performed at an earlier process stage, i.e. after the transfer of the cantilever beam pattern into the silicon wafer substrate, the removal of the silicon dioxide cantilever beam mask, and concurrently with the etching of the tip (see FIG. 2a). To obtain a tip shaft with concave sidewalls, the etching is preferably carried out in an Ar/Cl₂ ambient at a high pressure of about 100 μbar. In this case, the original height of the tip shaft (261) has to be about twice the height of the final tip, as the conically shaped tip shaft is divided in practically two equal parts by thermal oxidation and oxide stripping.

We claim:

1. A process of fabricating a micromechanical sensor for AFM/STM/MFM profilometry, which sensor includes a cantilever beam and a tip at one end of the cantilever beam, the process comprising the following steps:

(a) producing a cantilever-beam-pattern mask of a desired cantilever beam pattern on a first side of a wafer, and a thinning-window mask on a second side of the wafer;

(b) producing a tip-pattern mask of a desired tip pattern in the area of the cantilever-beam-pattern mask on the first side of the wafer;

(c) etching through the thinning-window mask on the second side of said wafer to thin down the wafer to a desired thickness;

(d) transferring the cantilever beam pattern defined by the cantilever-beam-pattern mask into said wafer by etching, and removing the cantilever-beam-pattern mask;

(e) transferring the tip pattern defined by the tip-pattern mask in the area of said cantilever beam pattern into said wafer by etching to form a cantilever beam/tip blank;

(f) thermally oxidizing exposed surfaces of the cantilever beam/tip blank to a desired thickness; and (g) removing oxide produced in step (f) by etching, thereby exposing the desired cantilever beam/tip structure.

2. The process according to claim 1, wherein the wafer substrate consists of single-crystalline silicon, and the layers on the first side and on the second side of the wafer consist of thermally-grown silicon dioxide, or sputtered oxide, or (PE)CVD oxide.

3. The process according to claim 2, wherein the desired cantilever beam pattern is defined in said silicon dioxide layer on the first side of said wafer, using a first photolithographic step and a wet or dry etching step.

4. The process according to claim 3, wherein simultaneously with said first photolithographic step and said etching step rectangular thinning-window openings are made on the second side of said wafer.

5. The process according to claim 3, wherein the desired tip pattern is defined in the area of the cantilever beam pattern in said silicon dioxide layer using a second photolithographic step and a wet or dry etching step.

6. The process according to claim 2, wherein prior to the mask structure transfer into the silicon wafer substrate of said substrate is thinned down by anisotropic etching from the second side of the wafer with aqueous KOH solution approxmitely 37.5 weight percent at about 80 degrees C.

7. The process according to claim 2, wherein the cantilever beam pattern is anisotropically etched into the silicon wafer substrate using a silicon dioxide mask and $Ar/Cl_2$ or $He/Cl_2$ as etch gas at a pressure of about 2 to 20 μbar; and wherein silicon dioxide mask is removed by etching with $CF_4$ as etch gas at a pressure of about 1 to 10 μbar.

8. The process according to claim 2, wherein the tip is anisotropically etched in the area of cantilever beam into the substrate and concurrently shaped, using silicon dioxide mask, and $Ar/Cl_2$ or $He/Cl_2$ as etch gas, and wherein silicon dioxide tip mask is removed by etching with $CF_4$ as etch gas at a pressure in the range of from about 1 to about 10 μbar.

9. The process according to claim 8, wherein the anisotropic etching step is performed at a pressure of about 100 μbar a self bias voltage of the reactor of about 300 V DC, to obtain a concave tip shape.

10. The process according to claim 9, wherein concurrently with the etching and shaping of the tip the cantilever beam is released from the silicon body.

11. The process according to claim 8, wherein the silicon structure resulting from the anisotropic dry etching steps is thermally oxidized at a temperature of at least about 1000° C. in water vapor, and wherein the thermally grown silicon dioxide is removed by wet etching in buffered hydrofluoric acid, thereby exposing the tip on the cantilever beam.

12. A process of fabricating a micromechanical sensor for AFM/STM/MFM profilometry, which sensor includes a cantilever beam and a tip projecting from a pedestal at one end of the cantilever beam, the process comprising the following steps:

(a) producing a cantilever-beam-pattern mask of a desired cantilever beam pattern on a first side of a wafer, and a thinning-window mask on a second side of the wafer;

(b) producing a tip-pattern mask of a desired tip pattern in the area of said first mask on the first side of the wafer;

(c) etching through the thinning-window mask on the second side of said wafer to thin down the wafer to a desired thickness;

(d) transferring the cantilever beam pattern defined by the cantilever-beam-pattern mask into said wafer by etching, and removing the cantilever-beam-pattern mask;

(e) transferring the tip pattern defined by the tip-pattern mask in the area of said cantilever beam pattern into said wafer by etching to form a cantilever beam/tip blank;

(f) thermally oxidizing exposed surfaces of the cantilever beam/tip blank to a desired thickness; and (g) removing oxide produced in step (f) from the horizontal surfaces of said cantilever beam pattern by etching, etching the pedestal into said substrate, and finally removing said oxide from the vertical surfaces of cantilever beam/tip structure, and the tip-pattern mask thereby exposing said tip on the pedestal on the cantilever beam.

13. The process of claim 12, wherein the wafer substrate consists of single-crystalline silicon, and the layers on the first side and on the second side of the wafer consist of thermally-grown silicon dioxide, or sputtered oxide, or (PE)CVD oxide.

14. The process according to claim 13, wherein the desired cantilever beam pattern is defined in said silicon dioxide layer on the first side of said wafer, using a first photolithographic step and a wet or dry etching step.

15. The process according to claim 14, wherein simultaneously with said first photolithographic step and said etching step rectangular openings are made on the second side of said wafer.

16. The process according to claim 14, wherein the desired tip pattern is defined in the area of the cantilever beam pattern in said silicon dioxide layer using a second photolithographic step and a wet or dry etching step.

17. The process according to claim 13, wherein prior to the mask structure transfer into the silicon wafer substrate of said substrate is thinned down by anisotropic etching from the second side of the wafer with aqueous KOH solution approximately 37.5 wt percent at about 80° C.

18. The process according to claim 13, wherein the cantilever beam pattern is anisotropically etched into the silicon wafer substrate using a silicon dioxide mask and $Ar/Cl_2$ or $He/Cl_2$ an etch gas at a pressure of about 2 to 20 μbar; and wherein silicon dioxide mask is removed by etching with $CF_4$ as etch gas at a pressure of about 1 to 10 μbar.

19. The process according to claim 13, wherein the tip is anisotropically etched in the area of cantilever beam into the substrate and concurrently shaped, using silicon dioxide mask, and $Ar/Cl_2$ or $He/Cl_2$ as etch gas, and wherein silicon dioxide tip mask is removed by etching with $CF_4$ as etch gas at a pressure in the range from about 1 to about 10 μbar.

20. A process according to claim 19, wherein the anisotropic etching step is performed at a pressure of about 100 μbar a self bias voltage of the reactor of about 300 V DC, thereby obtaining a concave tip shape.

21. The process according to claim 20, wherein concurrently with the etching and shaping of the tip the cantilever beam is released from the silicon body.

22. The process according to claim 19, wherein the silicon structure resulting from the anisotropic dry etching steps is thermally oxidized at a temperature of at least about 1000° C. in water vapor, and wherein the thermally grown silicon dioxide is removed by wet etching in buffered hydrofluoric acid, thereby exposing the tip on the cantilever beam.

23. The process according to claim 18, wherein following the transfer of the cantilever beam pattern into the silicon wafer substrate by reactive ion etching, the tip is anisotropically etched in the area of cantilever beam into the substrate, using silicon dioxide mask and $Ar/Cl_2$ or $He/Cl_2$ as etch gas.

24. The process according to claim 23, wherein in order to obtain a tip shaft with straight sidewalls the etching is carried out in $Ar/Cl_2$ at a pressure of about 10 μbar.

25. The process according to claim 23, wherein in order to obtain a tip shaft with concave sidewalls the etching is carried out in $Ar/Cl_2$ at a pressure of about 10 μbar.

26. The process according to claim 25, wherein the silicon structure is thermally oxidized at a temperature of at least about 1000° C. in water vapor, and wherein the thermally grown silicon dioxide is removed from the horizontal surfaces of cantilever beam and silicon substrate by anisotropic etching with $CF_4$ as etch gas at a pressure of about 1 to 10 μbar.

27. The process according to claim 26, wherein pedestal is etched to the desired depth into the cantilever beam substrate, using the silicon dioxide layers on the vertical surfaces of cantilever beam/tip structure and tip mask as masks, and $Ar/Cl_2$ or $He/Cl_2$ as etch gas at a pressure of about 10 μbar.

28. The process according to claim 27, wherein concurrently with the etching of pedestal (29) the cantilever beam is released from the wafer body (21).

29. The process according to claim 28, wherein the remaining silicon dioxide masks are removed by etching with buffered hydrofluoric acid.

30. The process according to claim 29, wherein the tip is pointed in a maskless argon ion etching process.

* * * * *